United States Patent [19]

Ruckwardt

[11] Patent Number: 5,447,337
[45] Date of Patent: Sep. 5, 1995

[54] CLAMPING-TYPE COUPLING

[75] Inventor: Hans-Werner Ruckwardt, Gollheim/Pfalz, Germany

[73] Assignee: TRW United-Carr GmbH & Co. KG, Enkenbach-Alsenborn, Germany

[21] Appl. No.: 192,974

[22] Filed: Feb. 8, 1994

[30] Foreign Application Priority Data

Feb. 26, 1993 [DE] Germany .......... 43 06 028.5

[51] Int. Cl.$^6$ .................................... F16L 35/00
[52] U.S. Cl. .................................... 285/24; 285/320; 285/423
[58] Field of Search .................... 285/320, 319, 24, 27, 285/423

[56] References Cited

U.S. PATENT DOCUMENTS

| | | | |
|---|---|---|---|
| 3,686,896 | 8/1972 | Rutter | 285/320 X |
| 4,444,419 | 4/1984 | Maeshiba | 285/320 X |
| 5,123,677 | 6/1992 | Kreczko et al. | 285/320 X |
| 5,150,880 | 9/1992 | Austin et al. | 285/320 X |

Primary Examiner—Dave W. Arola
Attorney, Agent, or Firm—Fay, Sharpe, Beall, Fagan, Minnich & McKee

[57] ABSTRACT

A tube-type coupling or clamping joint is formed of plastic and comprises two cylindrical cartridge-shaped body portions 2, 3 having end regions 8, 9 which interfittingly overlap and mate with each other in a detachably connected manner. At least one locking part 10 is arranged for joining the elements 2, 3. One end region of one of the cartridge-shaped elements carries at its outer circumference at least two stop elements 11, 11' which extend at right angles to the longitudinal axis L—L. Axially behind the stops 11, 11' there is arranged to be inserted as a portion of the locking part 10 a stop arm 12, 12' that can rotate at right angles vis-a-vis the longitudinal axis of the coupling. Located in the other end region 9 of the mating cartridge-shaped element is a resilient ring element 14 and a locating flange 16.

5 Claims, 2 Drawing Sheets

CLAMPING-TYPE COUPLING

BACKGROUND OF THE INVENTION

The subject invention relates to a clamping-type tube coupling made of plastic and comprising two generally cylindrical, cartridge-shaped sections whose end regions interfit and overlap and are detachably connected with each other via at least one locking element.

In the current general state of the art, such coupling joints are already known which respectively function to unite tube or hose-shaped components. Typically, couplings of this type are interconnected by means of a rotatable clamping cartridge which acts upon bayonet-like locking parts and converts the coupling from an open to a closed position to unite the cartridge-shaped elements with each other under tension. These known clamping-type coupling joints require substantial technical expenditure and, additionally, rotation around the longitudinal axis of the two cartridge-shaped elements is required in order to move them between their open and closed positions.

In contrast to the known prior art couplings, the present invention has the objective of creating a clamping-type coupling of the type initially discussed above that connects two cartridge-shaped components in a functionally safe manner and with little expenditure of time.

SUMMARY OF THE INVENTION

According to the subject invention, the noted objective is achieved by providing an assembly wherein at least one end region of one of the two cartridge-shaped components carries at least two stops at spaced locations over the exterior circumference to extend at right angles to the longitudinal axis. Behind these stops there is respectively insertable a stop arm that functions as a locking piece. The stop arm is arranged for rotatable movement at right angles relative to the longitudinal axis and is located in the end region of the other of the two cartridge-shaped components. Moveover, these exists in the overlapping interfitting zone between the two mentioned end regions at least one elastic and resilient spring-like element which can be a sealing gasket. As a result of the special design and construction of the clamping-type coupling, the two cartridge-shaped parts can be joined quickly and functionally securely without requiring any rotation of the components about the longitudinal axis.

Further, in accordance with a more limited aspect of the invention, there may be provided two stops and two stop arms located diagonally opposite each other in the respective end regions. Moreover, the spring element can be designed as circumferentially extending elastic sealing ring of the O-ring type which is carried and mounted in the end region having the stops. The elastic ring is arranged and located so that it frontally acts upon the inner circumference of the other mating end region. Consequently, this elastic ring thus has a dual function. On the one hand, it serves as a gasket or seal between the end regions of the cartridge-shaped components and, secondly, it exerts a radially directed spring-type biasing effect which, in cooperation with the stop arms and the stops, acts to produce a functionally secure holding of the joint.

In order to improve the sealing effect of the elastic spring ring, the front side of the ring can be embedded or fitting within at least one groove at the interior circumference of the end region. Furthermore, a circumferential centering flange located in the one end region may desirably and beneficially join the ring with the radial outer face surface of the centering flange abutting the inner circumference of the mating other end region. Because of the centering flange, the two mating end regions of the cartridge-shaped elements are more correctly oriented relative to their desired position vis-a-vis the longitudinal axis.

Preferably, the overlapping end regions of the two cartridge-shaped elements can have two recesses into which are embeddably received the stops that extend from the other end region. The recesses into which the stops are received are limited at the end due to the storage locations of a swivel axis of the respective stop arm. Each stop arm can preferably be designed with dual wings including one engagement wing portion and one activation wing. Furthermore, the engagement wing can be embedded in a groove formed in the stop, and the stops may be located in the end regions of the noted recesses.

BRIEF DESCRIPTION OF THE DRAWINGS

The above and other objects and advantages of the invention will become apparent from the following description when read in conjunction with the accompanying drawings wherein.

DETAILED DESCRIPTION OF THE PREFERRED EMBODIMENT

Figure 1:
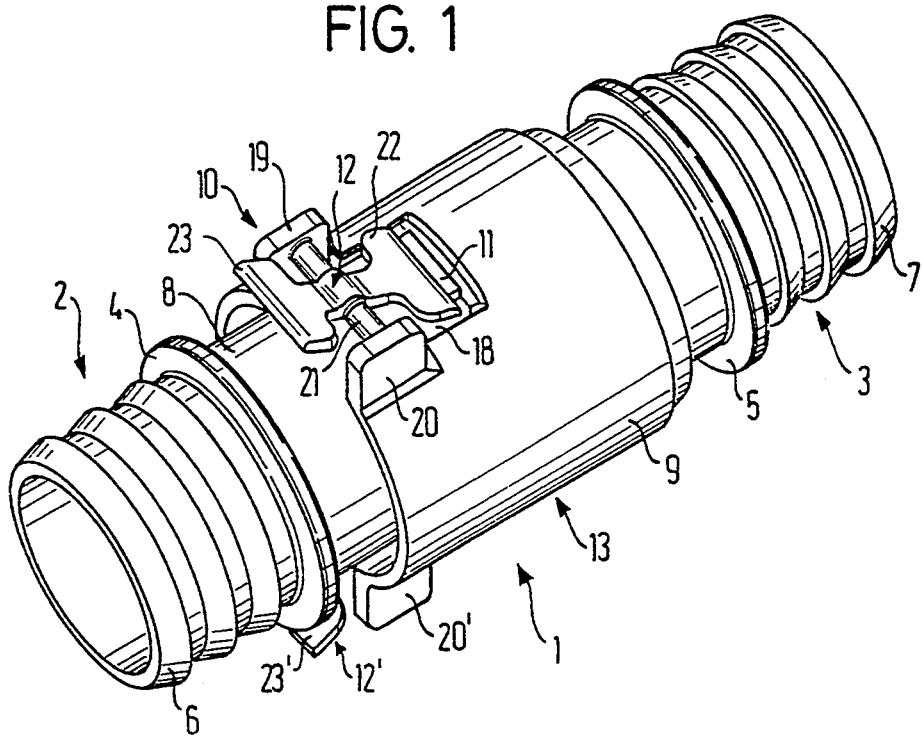
FIG. 1 is a perspective view of a preferred embodiment of a clamping-type tube joint or coupling formed in accordance with a preferred embodiment of the invention.
Figure 2:
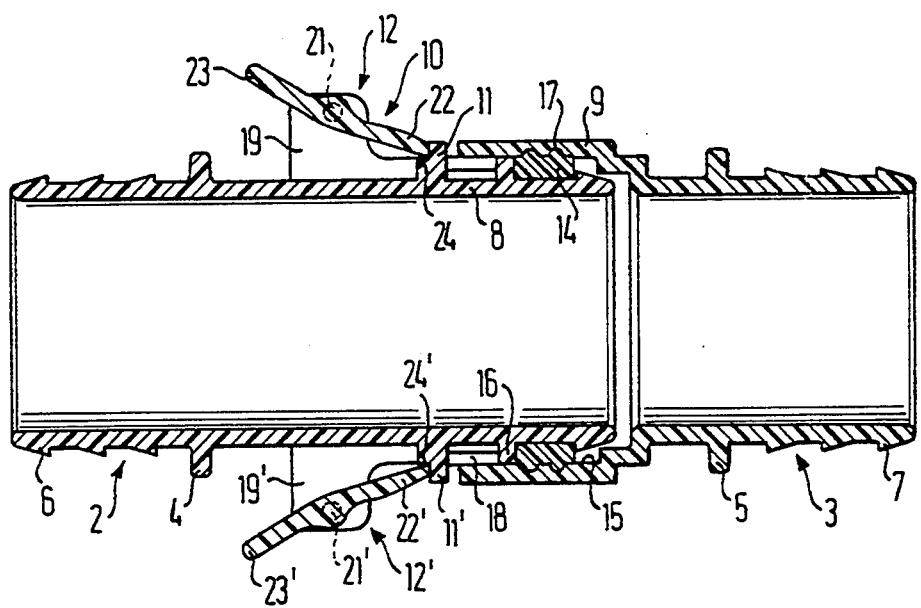
FIG. 2 is a longitudinal cross-sectional view through the coupling of FIG. 1.
Figure 3:
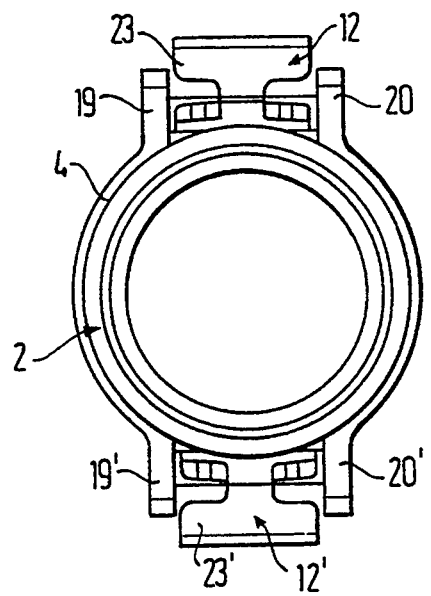
FIG. 3 is a left-hand end view of the coupling of FIG. 1.
Figure 4:
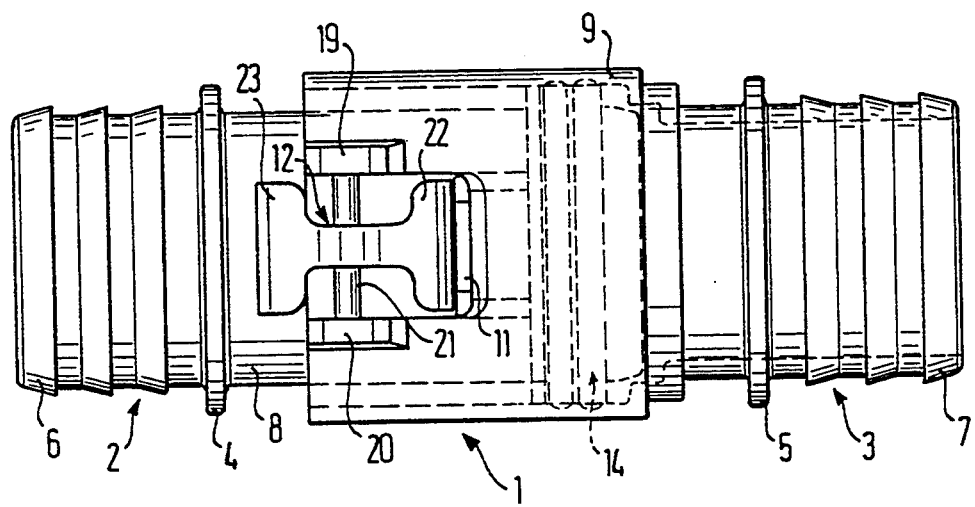
FIG. 4 is a top plan view of the coupling of FIG. 1.

Referring more particularly to the drawings wherein the showings are for the purpose of illustrating a preferred embodiment of the invention only and not for the purpose of limiting same, FIGS. 1 through 4 illustrate the clamping joint or coupling 1 as formed of a suitable plastics material and generally comprising two, somewhat cylindrical, cartridge-shaped elements 2 and 3. As can best be seen in FIGS. 1, 2, and 4, the cartridge-shaped elements 2, 3 each have an end portion including a respective circumferential flange 4, 5 followed by conical barbs or rings 6, 7. The end regions carrying the conical barbs or rings 6, 7 are intended to receive and join to tube or hose-shaped components (not shown) that can be pushed onto the barbed sections until they frontally abut the flanges 4 or 5. The barbed sections grip the associated tube in a sealed manner that is well known.

The cartridge-shaped element 2 includes a second end region e that is telescopically received in and overlapped by an overlapped zone 13 formed by an end region 9 of the cartridge-shaped element 3. The end region 9 includes two diametrically located, opposing recesses 18. At the axial outer end of the recesses 9, there are located radially outwardly extending webs or storage locations 19 and 20 or 19' and 20' (see FIG. 3).

The outwardly extending storage locations 19, 20 or 19', 20' respectively serve for carrying and supporting a swivel axis member 21 or 21'. The swivel axis element of each carries a stop arm 12 or 12'. Each of the stop arms 12, 12' is designed with two wing portions which extend in generally axial direction and include an engagement wing 22 or 22' and an actuation wing 23 or 23'. By manually engaging the actuating wing 23 or 23', it is possible to pivot the wings about the swivel axis 21 or 21' to move the engagement wing 22 or 22' from an engaged and locked position to a disengaged release position. This will subsequently become apparent as the description proceeds.

The end region 8 of the cartridge-shaped element 2 carries two stops 11, 11' that face the stop arms and are adapted to engage with the engagement wings 22, 22' of the stop arms 12, 12' respectively. As shown, the stops 11, 11' are located diametrically opposite one another for engagement and cooperation with the stop arms. Preferably, the stops 11, 11' are respectively equipped with a groove 24 or 24' (see FIG. 2). As is apparent from FIGS. 1 and 4, the stops 11 or 11' are located at the radial outer end of the recesses be so that the overall design is compact and requires a minimum of space.

Spaced axially from the stops 11, 11' there is located in the end region 8 a circumferentially extending spring element 14 which is in the form of an elastic gasket or seal-like member 14 that engages with its front side in a groove 17 at the inner circumference of end region 9 of cartridge-shaped part 3. This engagement takes place when the end region 9 of the cartridge-shaped part 3 is in mating overlapping relationship with the end region 8 of the cartridge-shaped part 2. When in this engaged, overlapped relationship, the engagement wings 21 and 22' of stop arms 12, 12' position themselves into the respective grooves 24, 24' of stops 11, 11'. Thus, there is provided an excellent and adjusted fixation of the cartridge-shaped element 2 within the cartridge-shaped element 3.

Excellent orientation vis-a-vis the longitudinal axis L—L results from the presence of the resilient ring 14 and the limitation of movement produced by one side of a centering flange 16 which is formed in the end portion or end region 8 of the cartridge-shaped part 2. The radial outer surface of the centering flange 16 is positioned and sized so that it engages at the inner circumference 15 of the end region 9 of the cartridge-shaped element 3. The centering flange 16 in cooperation with the positioning produced by engagement of wings 21 and 22' into the groove 24 or 24' produces an excellent adjustment of the two cartridge-shaped elements 2 and 3.

Through the clamping joint or coupling formed according to the invention, the two cartridge-shaped elements 2 and 3 are accurately positioned in a simple fashion and are connected in a sealed fluid-tight condition with each other. This results due to the effect upon the engagement wings 22 or 22' of the stop arms 12 or 12'. Disengagement, however, is accomplished simply by merely moving the engagement wings out of the respective grooves of stops 11 or 12.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a clamping joint type tube coupling made of plastic material and comprising generally cylindrical male and female body elements each having a longitudinal axis and terminal ends that interfit and overlap each other for detachable connection with one another, the improvement wherein the male body element has at its outer circumference and spaced from its terminal end at least two radially outwardly extending stops arranged at right angles to the longitudinal axis, the female body element having recesses which extend longitudinally inwardly from the terminal end of the female body element to a recess inner end for receiving separate ones of the said stops when the male and female body elements are connected with one another, a separate pivotally mounted stop arm associated with each said recess, each said stop arm being joined to the female element and rotatable about a pivot axis that is at right angles to the longitudinal axis and located longitudinally and radially outward of the recess inner end, each arm further having a free end extending from the pivot axis toward the inner end of the associated recess and engageable with the respective stop when the male and female body elements are engaged, and a circumferential seal ring located between the terminal end of the male body element and the stops.

2. The tube coupling according to claim 1 wherein there are two of the stops and associated stop arms located at diametrically opposed locations on the body elements.

3. The tube coupling according to claim 1 wherein the seal ring is located in a groove formed in the male body element.

4. The tube coupling according to claim 3 including a radially extending circumferential centering flange located adjacent the seal ring for engaging the interior of the female body element.

5. The tube coupling according to claim 1 wherein each stop arm includes a manually operable actuating wing portion.

* * * * *